Aug. 10, 1965  L. CHRYSLER ETAL  3,199,696
SELF-LOADING AND UNLOADING VEHICLE
Filed Oct. 3, 1963  2 Sheets-Sheet 1
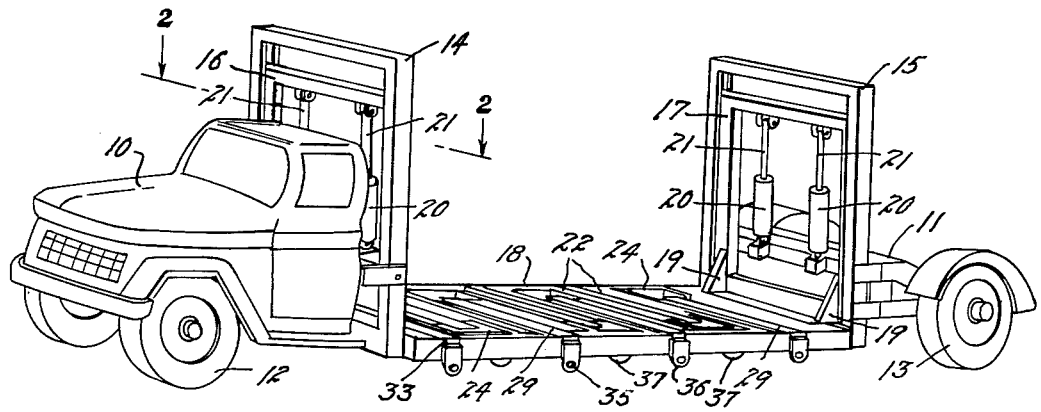
INVENTORS.
LOUIS CHRYSLER
PAUL M. STOCKTON
BY:
ATTORNEY Aug. 10, 1965

L. CHRYSLER ETAL 3,199,696

SELF-LOADING AND UNLOADING VEHICLE

Filed Oct. 3, 1963

INVENTORS.
LOUIS CHRYSLER
PAUL M. STOCKTON

BY:

ATTORNEY

United States Patent Office 3,199,696
Patented Aug. 10, 1965

3,199,696
SELF-LOADING AND UNLOADING VEHICLE
Louis Chrysler, 743 Glencoe St., and Paul M. Stockton,
Box 412, 2000 W. 92nd, both of Denver, Colo.
Filed Oct. 3, 1963, Ser. No. 313,484
8 Claims. (Cl. 214—512)

This invention relates to a vehicle body and more particularly to a heavy duty truck or trailer body.

It is difficult to load and unload heavy merchandise upon the usual commercial vehicle without special loading equipment. The principal object of this invention is to provide a body for a vehicle of the commercial type which: will be substantially self-loading and unloading; which, under control of the operator, can be used to pick up loads at either side of the vehicle and convey and deposit the loads at desired positions on the vehicle body; and which will pick up loads from the body and deposit the same at either side of the vehicle.

A further object is to provide a vehicle of this type in which the medial or load carrying portion of the vehicle can be lowered to the ground to facilitate loading and unloading operations.

A still further object is to provide a hydraulically-operated, self-loading and unloading vehicle in which the only manual operation required is simple valve manipulation.

Other objects and advantages reside in the detail construction of the invention, which is designed for simplicity, economy, and efficiency. These will become more apparent from the following description.

In the following detailed description of the invention, reference is made to the accompanying drawings which form a part hereof. Like numerals refer to like parts in all views of the drawings and throughout the description.

In the drawings:

FIG. 1 is a perspective view of the vehicle to be described herein;

FIG. 2 is an enlarged, fragmentary plan view of the mid or load carrying portion of the vehicle;

Figure 3:
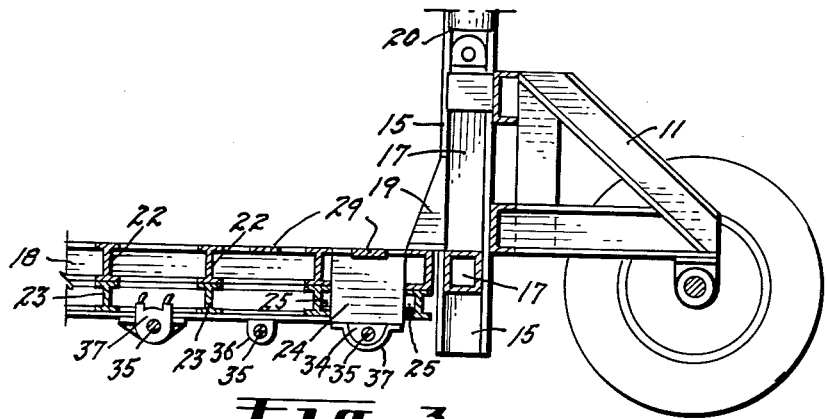
FIG. 3 is a fragmentary, longitudinal section of the load carrying portion taken on the line 3—3, FIG. 2.
Figure 4:
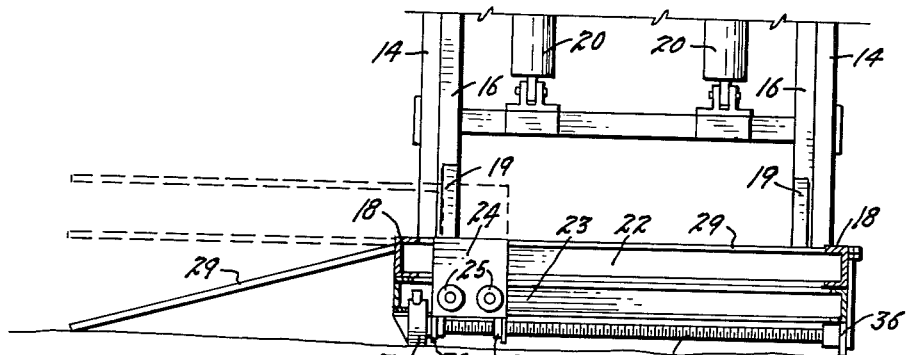
FIG. 4 is a cross section taken on the line 4—4, FIG. 2.
Figure 5:
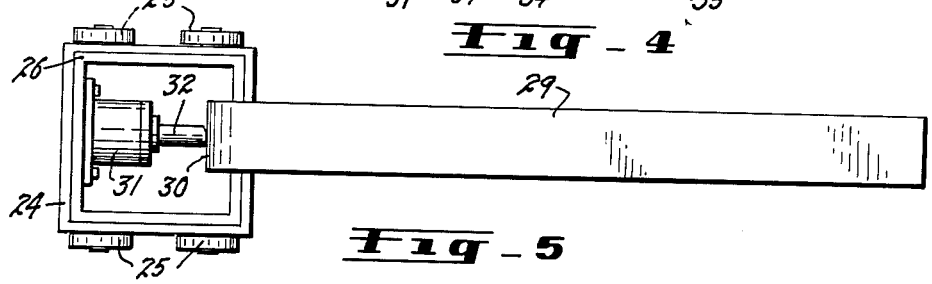
FIG. 5 is a detail top view of a loading carriage element to be later described.

The load carrying portion of the vehicle is positioned, and forms a connection, between a motor-cab portion 10 and a rear trailing portion 11. The motor-cab portion is provided with front steerable wheels 12 driven from a suitable conventional automotive engine. The trailing frame 11 is supported upon trailing wheels 13.

The motor-cab portion 10 is provided with a rectangular, rigid, vertical, front channel track frame 14 and the trailing portion 11 is similarly provided with a similar rectangular, rigid, vertical, rear channel track frame 15. A vertical, front, chassis frame 16 is mounted in and travels vertically in the front channel track frame 14 and a similar, vertical, rear chassis frame 17 is similarly mounted in the rear channel track frame 15. The two chassis frames 16 and 17 are rigidly and perpendicularly connected to the forward and rear extremities of a rectangular, horizontal deck frame 18 in any suitable manner, such as through the medium of rigid angle braces 19. Thus, the vertically movable deck frame provides the sole connection between the motor-cab portion 10 and the trailing portion 11. The latter portions cannot tilt forward or back since the chassis frames 16 and 17 are snugly and slidably fitted for vertical movement only in the two channel frames 14 and 15, respectively.

Vertical movement is imparted to the chassis frames 16 and 17, and through them to the deck frame 18, by means of hydraulic cylinders 20 which are mounted in any practical manner on the front portion 10 and the trailing portion 11, respectively, and which actuate vertical plungers 21 connected to the chassis frames 16 and 17, respectively. The cylinders 20 are actuated from a hydraulic system such as conventionally employed in vehicles having hydraulic implementation (not shown). Thus, it can be seen that when fluid is introduced into the cylinders 20, the deck frame 18 can be elevated to any height permitted by the frames 14 and 15 and when fluid is discharged from the cylinders, the deck frame 18 can be lowered to rest upon the ground with the track frames remaining vertical.

A plurality of parallel, spaced-apart floor beams 22 extend transversally between the two sides of the deck frame 18 and support roller tracks 23 therebelow which movably support a loading carriage element between each pair of adjacent floor beams 22.

The loading carriage elements are similar and each comprises an outer box 24 provided with supporting rollers 25 at its forward and rear faces which travel in the roller tracks 23 and movably support the outer boxes 24. An inner box 26 is vertically slidable in the outer box 24, vertical movement being imparted by a hydraulic cylinder 27 mounted in the outer box and actuating a vertical plunger 28 against the inner box 26. Thus, it can be seen that the inner box can be hydraulically elevated in the outer box to the full extent of the cylinder 27.

Figure 6:
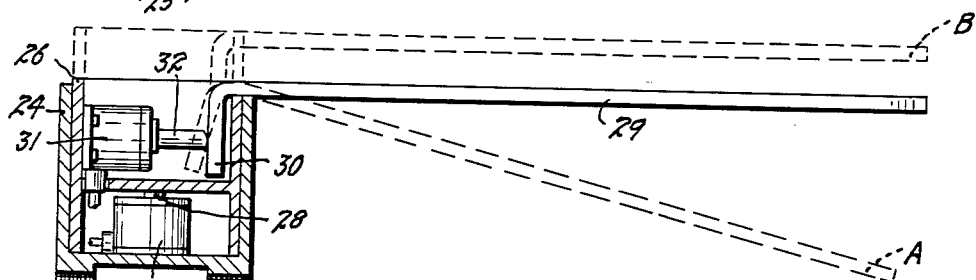
FIG. 6 is a side elevational view of the loading element of FIG. 5.

One side of each inner box is notched to provide a seating notch for an elongated lift arm 29. Each lift arm 29 is formed with a relatively short perpendicular, downwardly-turned, unitary actuating lever 30 which extends downwardly into the inner box. A horizontally positioned hydraulic cylinder 31 is mounted on the inside of the side wall of the inner box and actuates a plunger 32 against the actuating lever 30 to force it against the opposite wall of the inner box so as to swing the lift arm 29 upwardly to a horizontal position as illustrated in FIG. 6.

As illustrated, there are seven loading carriage elements. It is to be understood that any desired number could be used to provide any desired loading arrangement. The loading carriage elements alternate in position in the deck frame 18 so that the lift arms 29 projects alternately to the left and to the right, as shown in FIG. 2. The side members of the deck frame are provided with guide notches 33 to receive and guide the lift arms 29.

The bottoms of the outer boxes are provided with internally threaded lugs 34 through which rotatable threaded shafts 35 extend, therebeing one threaded shaft positioned medially below each loading carriage element. Each threaded shaft is journalled at one extremity in a supporting bearing 36, mounted on one side of the deck frame, and is connected to a hydraulic motor 37, mounted on the other side of the deck frame, at its other extremity. The hydraulic cylinders 27 and 31 are connected by means of suitable flexible hoses (not shown) and through conventional control valves to the hydraulic system of the vehicle and the hydraulic motors 37 are also connected to the conventional hydraulic system through suitable control valves, as is customary with hydraulically operated equipment.

It is believed the operation and use will be apparent from the above. Briefly, the vehicle is driven alongside of merchandise piled upon conventional pallets. Fluid is discharged from the hydraulic cylinders 20 to allow the deck frame to descend to the floor. Certain of the hydraulic motors 37 are operated to project the desired lift arms 29 outwardly at a downwardly inclined angle (as shown in broken line at "A," FIG. 6) beneath the pallet carrying the load. Fluid is then supplied to the horizontal hydraulic cylinders 31 of the selected loading carriage elements to swing the lift arms upwardly, to the solid line position of FIG. 6, so as to lift the load from the floor. Fluid is now supplied to the hydraulic cylinders 27 to lift the pallet above the deck level (as indicated in broken line at "B" in FIG. 6) and the hydraulic motors 37 are reversed to move the lifting arms back to their original position over the deck frame. Fluid is then discharged from the hydraulic cylinders 27 to lower the load onto the floor beams 22. To unload, from either side, the above procedure is simply reversed. For transportation, fluid is supplied to the hydraulic cylinders 20 to elevate the deck frame for road travel.

While a specific form of the invention has been described and illustrated, herein, it is to be understood that the same may be varied, within the scope of the appended claims, without departing from the spirit of the invention.

Having thus described the invention, what is claimed and desired to be secured by Letters Patent is:

1. A vehicle bed comprising: an elongated, rectangular bed frame; a plurality of floor beams extending transversely of said frame in spaced-apart relation; track members extending longitudinally of said floor beams; an outer box element movably supported in the track members between adjacent floor beams; a vertically movable inner element in said outer box; means for urging said inner element upwardly; means for moving said outer box element longitudinally of said track members; and a lift arm pivotally mounted at its inner extremity on a horizontal axis in said inner element and extending to one side thereof parallel to and between adjacent floor beams so as to be projected sidewardly from said bed frame when said outer box element is moved toward the latter side.

2. A vehicle bed as described in claim 1 having means in said inner element for raising and lowering the projecting outer extremity of said lift arm.

3. A vehicle bed as described in claim 1 in which the inner element comprises an inner box vertically movable in said outer box; and in which the means for urging comprises a hydraulically expansible element positioned between said outer and inner boxes for raising the latter in the former.

4. A vehicle bed as described in claim 1 in which the means for moving said outer box element longitudinally comprises a rotatable threaded shaft positioned intermediate adjacent floor beams; threads carried by said outer box element in engagement with said threaded shaft; and reversible motor means connected to said shaft for rotating said shaft in either desired direction.

5. A vehicle bed as described in claim 2 in which the means for raising and lowering the projecting extremity of said lift arm comprises an actuating lever affixed to the inner extremity of said lift arm and extending downwardly in said box and a horizontally expansible hydraulic element in said box acting against said actuating lever to swing the latter horizontally to impart a vertical swing to said lift arm.

6. A vehicle bed as described in claim 1 having means for raising and lowering said bed frame.

7. A vehicle bed comprising: an elongated, rectangular bed frame; a plurality of floor beams extending transversely of said frame in spaced-apart relation; track members extending longitudinally of said floor beams; carriage elements movably supported in said track members between adjacent floor beams; a load lifting element mounted on each carriage element; means for raising and lowering said load lifting element relative to its carriage element; and a lift arm pivotally mounted at its one extremity in said load lifting element; and means carried by said load lifting elements for swinging said lift arms upwardly and downwardly.

8. A vehicle bed as described in claim 7 having means for propelling said carriage elements along said track members.

References Cited by the Examiner

UNITED STATES PATENTS

| Re. 23,546 | 9/52 | Dempster | 214—75 |
| 2,132,612 | 10/38 | Faries. | |
| 2,267,270 | 12/41 | Deetz et al. | |
| 2,379,094 | 6/45 | Maxson | 214—512 X |
| 2,574,045 | 11/51 | Lapham | 214—731 |
| 2,828,027 | 3/58 | Stevenson et al. | |
| 2,915,204 | 12/59 | Alimanestiano. | |

HUGO O. SCHULZ, *Primary Examiner.*